F. G. Niedringhaus,
Spoon.

N° 83,300. Patented Oct. 20, 1868.

Witnesses.
H. H. Young
W. Burris

Inventor.
F. G. Niedringhaus
By David A. Burr
Atty.

UNITED STATES PATENT OFFICE.

FREDERICK G. NIEDRINGHAUS, OF ST. LOUIS, MISSOURI.

IMPROVEMENT IN THE CONSTRUCTION OF METALLIC SPOONS.

Specification forming part of Letters Patent No. 83,300, dated October 20, 1868.

*To all whom it may concern:*

Be it known that I, FREDERICK G. NIEDRINGHAUS, of the city and county of St. Louis, and State of Missouri, have invented a new and useful Improvement in Metallic Spoons, Forks, Ladles, and similar Utensils; and I do hereby declare the following to be a full and exact description thereof, reference being had to the accompanying drawings, forming a part of this specification, in which—

Figure 1:
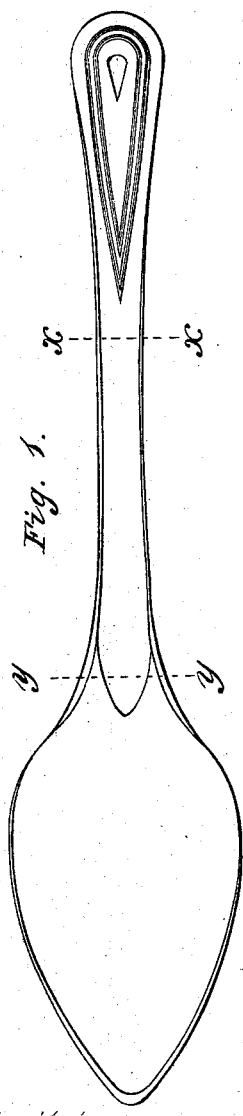
Figure 2:

Figure 1 is a plan view of my improved spoon; Fig. 2, a transverse section in the line *x x*, and Fig. 3 a similar section in the line *y y* of Fig. 1.

The nature of my invention consists in forming the handles of metallic spoons, ladles, forks, &c., with a longitudinally-curved or arched form, the edges being turned upward and the crown of the arch or curve placed downward; also, in turning down the edges of the bowl of the spoon (or the upper end of the fork) where joined to the handle, so as to form a curved flange at the neck of the bowl of the spoon, (or at the head of the fork,) greatly strengthening the same at its juncture with the handle.

Figure 3:

I manufacture these improved spoons either by molding or casting them of soft or molten metal, or by stamping them up in dies out of sheet metal. The dies or molds are so constructed as to impart a longitudinal curve or groove to the handle, which gradually swells out into the bowl of the spoon, as seen in Fig. 1 of the drawing. This form of curve in the handle not only strengthens it greatly, but makes it easier and more convenient for handling. I also impart an outward roll or curve to the edges of the bowl or head of the spoon or fork at its neck or juncture with the handle, as seen in Fig. 3 of the drawings, which gives very much additional strength to the utensil at this point thereof.

I do not claim, broadly, a longitudinally-grooved handle, as such handles for spoons, &c., have been made with edges bent down to form a channel on the under side thereof; nor do I claim a spoon or other utensil in which there is a middle longitudinal corrugation or ridge projecting upwardly along the narrow part of the handle, as described in F. Grosjean's patent, reissued June 20, 1864. My invention is an improvement upon each of these, and the improved curve of the handle in my spoons and forks presents a far better and stronger form to meet and resist strain thereon in dipping and stirring therewith. My improved handle will not buckle or bend under such strain as do those just referred to, and at its juncture with the bowl or head of the utensil so swells and spreads out gracefully, with an easy curve, free from any angle or break whatever, as to avoid entirely the weak places in the juncture of the handles and bowls or heads of other forms of spoons and forks, and, with the addition of the outward roll which I contemplate imparting to the edges of the handle and head or bowl at their juncture, as aforesaid, affords the greatest possible strength with the least amount of metal at such point.

Having thus described my improvements, what I claim as my invention, and desire to secure by Letters Patent, is—

1. A metallic spoon, fork, or similar utensil provided with a handle concaved or dished longitudinally on the upper side thereof, being curved from edge to edge, substantially as herein set forth.

2. Folding over or bending outwardly the edges of a fork, spoon, or similar utensil at the juncture of the handle with the head or bowl thereof, substantially as herein set forth.

F. G. NIEDRINGHAUS.

Witnesses:
 FRED. P. HAUS,
 FRED. WM. WIESEHAHN.